(12) United States Patent
Tada

(10) Patent No.: US 11,352,936 B2
(45) Date of Patent: Jun. 7, 2022

(54) INTERNAL COMBUSTION ENGINE

(71) Applicant: TOYOTA JIDOSHA KABUSHIKI KAISHA, Aichi-ken (JP)

(72) Inventor: Hiroshi Tada, Mishima (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 17/157,785

(22) Filed: Jan. 25, 2021

(65) Prior Publication Data
US 2021/0317770 A1     Oct. 14, 2021

(30) Foreign Application Priority Data

Apr. 8, 2020 (JP) .............................. JP2020-070027

(51) Int. Cl.
*F01P 3/02* (2006.01)
*F16J 15/08* (2006.01)

(52) U.S. Cl.
CPC ............. *F01P 3/02* (2013.01); *F16J 15/0825* (2013.01); *F01P 2003/021* (2013.01); *F01P 2003/024* (2013.01)

(58) Field of Classification Search
CPC ................... F01P 3/02; F01P 2003/021; F01P 2003/024; F01P 2003/028; F16J 15/0825; F16J 2015/0868
See application file for complete search history.

(56) References Cited

U.S. PATENT DOCUMENTS

| | | | | |
|---|---|---|---|---|
| 5,000,464 A * | 3/1991 | Yasui | ........................ | F01P 7/16 277/599 |
| 6,138,619 A * | 10/2000 | Etemad | ..................... | F01P 3/02 123/41.74 |
| 7,047,915 B2 * | 5/2006 | Kawai | ....................... | F01P 3/02 123/41.79 |
| 2003/0230254 A1 * | 12/2003 | Matsutani | ................. | F01P 3/02 123/41.79 |
| 2004/0083990 A1 * | 5/2004 | Suzuki | ................... | F02F 11/002 123/41.79 |
| 2017/0298860 A1 * | 10/2017 | Mori | .......................... | F01P 3/02 |
| 2019/0390629 A1 * | 12/2019 | Cierpial | .................... | F02F 1/14 |

FOREIGN PATENT DOCUMENTS

| | | |
|---|---|---|
| JP | H11166450 A | 6/1999 |
| JP | 200230989 A | 1/2002 |
| JP | 200690194 A | 4/2006 |
| JP | 201324081 A | 2/2013 |
| JP | 2019190373 A | 10/2019 |

* cited by examiner

*Primary Examiner* — Hung Q Nguyen
(74) *Attorney, Agent, or Firm* — Hauptman Ham, LLP

(57) ABSTRACT

An internal combustion engine is equipped with a cylinder block having a plurality of cylinders and an in-block water jacket, a cylinder head having an in-head water jacket, and a head gasket. The in-block water jacket includes a plurality of cylinder outer peripheral portions. The head gasket includes a plurality of coolant opening portions. The internal combustion engine is configured such that coolant sequentially flows through the cylinder outer peripheral portions along a cylinder bank direction in the in-block water jacket. The head gasket includes one or a plurality of dam portions provided, in such a manner as to block the flow of coolant, at a position downstream of the coolant opening portion corresponding to the cylinder outer peripheral portion located at least most downstream in an in-block coolant flow direction.

7 Claims, 7 Drawing Sheets

COMPARATIVE EXAMPLE

FIRST EMBODIMENT

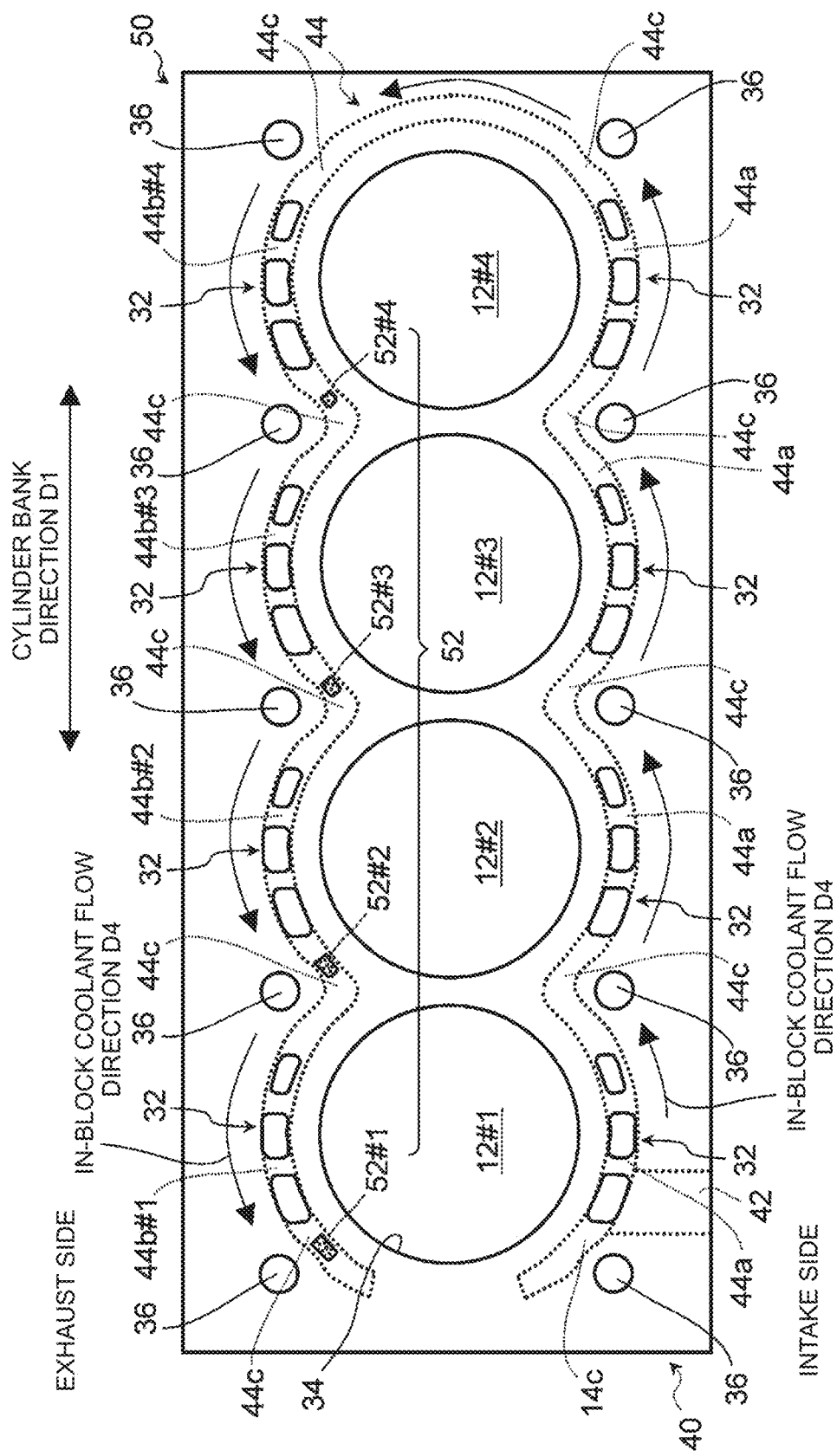

INTERNAL COMBUSTION ENGINE

CROSS-REFERENCE TO RELATED APPLICATION

This application claims priority to Japanese Patent Application No. 2020-070027 filed on Apr. 8, 2020, incorporated herein by reference in its entirety.

BACKGROUND

1. Technical Field

The disclosure relates to a water-cooled internal combustion engine.

2. Description of Related Art

An in-block water jacket is formed around a plurality of cylinders, in a cylinder block of an internal combustion engine. As one of methods of causing coolant to flow in this in-block water jacket, there is a vertical flow method for causing coolant to flow along a cylinder bank direction.

In Japanese Unexamined Patent Application Publication No. 2013-024081 (JP 2013-024081 A), there is disclosed an example of an internal combustion engine adopting a vertical flow method for causing coolant to flow. In JP 2013-024081 A, the following problem is mentioned as to the vertical flow method. That is, the temperature of coolant in an in-block water jacket rises due to the transfer of heat from a cylinder bore inner wall, in a direction from a coolant inlet provided at one end of a cylinder block in a cylinder bank direction toward a coolant outlet provided at the other end of the cylinder block in the cylinder bank direction. Therefore, the amount of heat transferred from the cylinder bore inner wall to coolant decreases in a direction from a front portion of the cylinder block (the coolant inlet side) toward a rear portion of the cylinder block (the coolant outlet side). This is because the difference between the temperature of the cylinder bore inner wall and the temperature of coolant decreases in the direction from the front portion of the cylinder block toward the rear portion of the cylinder block. As a result, the temperature of a cylinder bore outer wall rises in the direction from the front portion of the cylinder block toward the rear portion of the cylinder block (i.e., the temperature balance of the cylinder block deteriorates).

In view of the foregoing problem, in the internal combustion engine described in JP 2013-024081 A, the in-block water jacket is configured such that the cross-sectional area thereof decreases in the direction from the coolant inlet toward the coolant outlet. Besides, it is described in JP 2013-024081 A that "on the condition that the volumetric flow rate of coolant is substantially constant from the coolant inlet to the coolant outlet, the average speed of coolant rises in the direction toward the coolant outlet when the cross-sectional area of the water jacket decreases in the direction toward the coolant outlet". Moreover, it is described in JP 2013-024081 A that the aforementioned decrease in difference between the temperatures can be compensated for through this rise in average speed of coolant in the direction toward the coolant outlet, and that the temperature balance of the cylinder block can hence be improved.

Besides, in Japanese Unexamined Patent Application Publication No. 11-166450 (JP 11-166450 A), there is disclosed a head gasket that is equipped with a coolant passage hole for the passage of coolant in such a manner as to correspond to a coolant passage provided continuously to a cylinder head and a cylinder block, and a guide portion located close to the coolant passage hole to change the passage direction of coolant passing through the coolant passage hole. Besides, in Japanese Unexamined Patent Application Publication No. 2019-190373 (JP 2019-190373 A), there is disclosed a water jacket formed such that the depth thereof in a cylinder block is shallower on a downstream side than on an upstream side on one of an intake side and an exhaust side from one end side to the other end side in a cylinder bank direction, and that the depth thereof in the cylinder block is deeper on the downstream side than on the upstream side on the other of the intake side and the exhaust side from the other end side to one end side in the cylinder bank direction. Furthermore, in Japanese Unexamined Patent Application Publication No. 2002-030989 (JP 2002-030989 A), there is disclosed a cylinder block cooling structure in which the properties of a water jacket are set based on at least one of whether the temperature of a bore wall in a direction perpendicular to a cylinder bore axis is high or low, and whether the temperature of coolant passing through the periphery of the bore wall is high or low.

SUMMARY

By the way, in the case where the vertical flow method for coolant is adopted as is the case with the internal combustion engine described in JP 2013-024081 A, the following problem arises as to the dispersion of the flow rate of coolant flowing from the in-block water jacket toward a water jacket in a cylinder head (an in-head water jacket) among cylinders. That is, the flow rate of coolant flowing from the in-block water jacket toward the in-head water jacket is lower in a certain one of the cylinders located more downstream than in another one of the cylinders located more upstream in the flow direction of coolant in the in-block water jacket (i.e., the flow rate disperses among the cylinders). This is because coolant gradually rises from an upstream region in the in-block water jacket to the in-head water jacket, and the flow rate of coolant flowing through the in-block water jacket thereby falls in the direction toward the downstream side. In the case where the vertical flow method is adopted, it is desirable to be able to restrain the flow rate of coolant from dispersing among the cylinders in this manner.

The disclosure has been made in view of the problem as mentioned above. It is an object of the disclosure to provide an internal combustion engine that can restrain the flow rate of coolant from dispersing among cylinders, through the use of a simple method, as to the transfer of coolant from an in-block water jacket to an in-head water jacket.

An internal combustion engine according to the disclosure is equipped with a cylinder block having a plurality of cylinders arranged in series along a cylinder bank direction, and an in-block water jacket which is formed around the cylinders and through which coolant flows, a cylinder head having an in-head water jacket through which the coolant flows, and a head gasket that is interposed between the cylinder block and the cylinder head. The in-block water jacket includes a plurality of cylinder outer peripheral portions that are located on both an intake side and an exhaust side of the cylinders respectively. The head gasket includes a plurality of coolant opening portions that establish communication between the cylinder outer peripheral portions and the in-head water jacket respectively. The internal combustion engine is configured such that the coolant sequentially flows through the cylinder outer peripheral portions along the cylinder bank direction in the in-block water jacket. The head gasket includes one or a plurality of dam portions provided, in such a manner as to block the flow of the coolant, at a position downstream of the coolant opening portion corresponding to the cylinder outer peripheral portion located at least most downstream in an in-block coolant flow direction as a direction of flow of the coolant in the in-block water jacket.

The cylinder block may include a plurality of head bolt boss portions which are formed on an outer peripheral side of the in-block water jacket and into which a plurality of head bolts for fixing the cylinder head to the cylinder block via the head gasket are inserted respectively. Moreover, the dam portion or each of the dam portions may be arranged at a corresponding one of bolt peripheral portions that are regions of the in-block water jacket sandwiched by the head bolt boss portions and bore walls of the cylinders respectively.

The internal combustion engine may be configured such that the coolant sequentially flows through the cylinder outer peripheral portions along the cylinder bank direction, from one end to the other end in the cylinder bank direction, on both the intake side and the exhaust side of the in-block water jacket. The dam portion or the dam portions may include a plurality of dam portions arranged on at least one of the intake side and the exhaust side. Moreover, the dam portions may be formed such that an area of a certain one of the dam portions located more downstream in the in-block coolant flow direction is larger than an area of another one of the dam portions located more upstream in the in-block coolant flow direction.

The internal combustion engine may be configured such that the coolant sequentially flows through parts of the cylinder outer peripheral portions along the cylinder bank direction, from one end to the other end in the cylinder bank direction, on one of the intake side and the exhaust side of the in-block water jacket, and then flows through the other parts of the cylinder outer peripheral portions along the cylinder bank direction, from the other end to one end in the cylinder bank direction, on the other of the intake side and the exhaust side. The dam portion or the dam portions may include a plurality of dam portions arranged on at least one of the intake side and the exhaust side. Moreover, the dam portions may be formed such that an area of a certain one of the dam portions located more downstream in the in-block coolant flow direction is larger than an area of another one of the dam portions located more upstream in the in-block coolant flow direction.

The dam portion or the dam portions may include a plurality of dam portions arranged on at least one of the intake side and the exhaust side. The dam portions may be equal in area to one another. Moreover, the dam portions may be arranged downstream of the coolant opening portions corresponding to the cylinder outer peripheral portions except the cylinder outer peripheral portion located most upstream in the in-block coolant flow direction, respectively.

The head gasket may be a multi-layer structured metal head gasket. Moreover, the dam portion or the dam portions may be formed by bending part of a layer of the metal head gasket on the cylinder block side.

With the internal combustion engine according to the disclosure, part of a flow passage of coolant upstream of (immediately upstream of) the dam portion or the dam portions with which the head gasket is equipped is backed up by the dam portion or the dam portions. Therefore, the pressure of coolant upstream of the dam portion or the dam portions is enhanced. As a result, the flow rate of coolant flowing in the vicinity of the coolant opening portion upstream of (immediately upstream of) the dam portion or the dam portions can be recovered. Therefore, the disclosure can restrain the flow rate of coolant from dispersing among the cylinders, through the use of a simple method, as to the transfer of coolant from the in-block water jacket to the in-head water jacket.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 10 is a view of a head gasket and a cylinder block located therebelow according to the second embodiment of the disclosure, as viewed from a cylinder head side.

DETAILED DESCRIPTION OF EMBODIMENTS

In the respective embodiments that will be described hereinafter, elements that are common among the respective drawings are denoted by the same reference symbols respectively, and redundant description thereof will be omitted or simplified. Besides, in the case where numerals such as the number, quantity, amount, range, and the like of elements of each kind are mentioned, the disclosure is not limited to the mentioned numerals unless such limitation is clearly specified or the disclosure is in principle obviously limited to those numerals. Besides, the structures and the like that will be described in the following embodiments are not necessarily indispensable to the disclosure unless such indispensability is clearly specified or the disclosure is in principle obviously limited to those structures and the like.

1. First Embodiment

One of the embodiments of the disclosure and modification examples thereof will be described with reference to FIGS. 1 to 9.

1-1. Basic Configuration of Water Jacket

Figure 1:
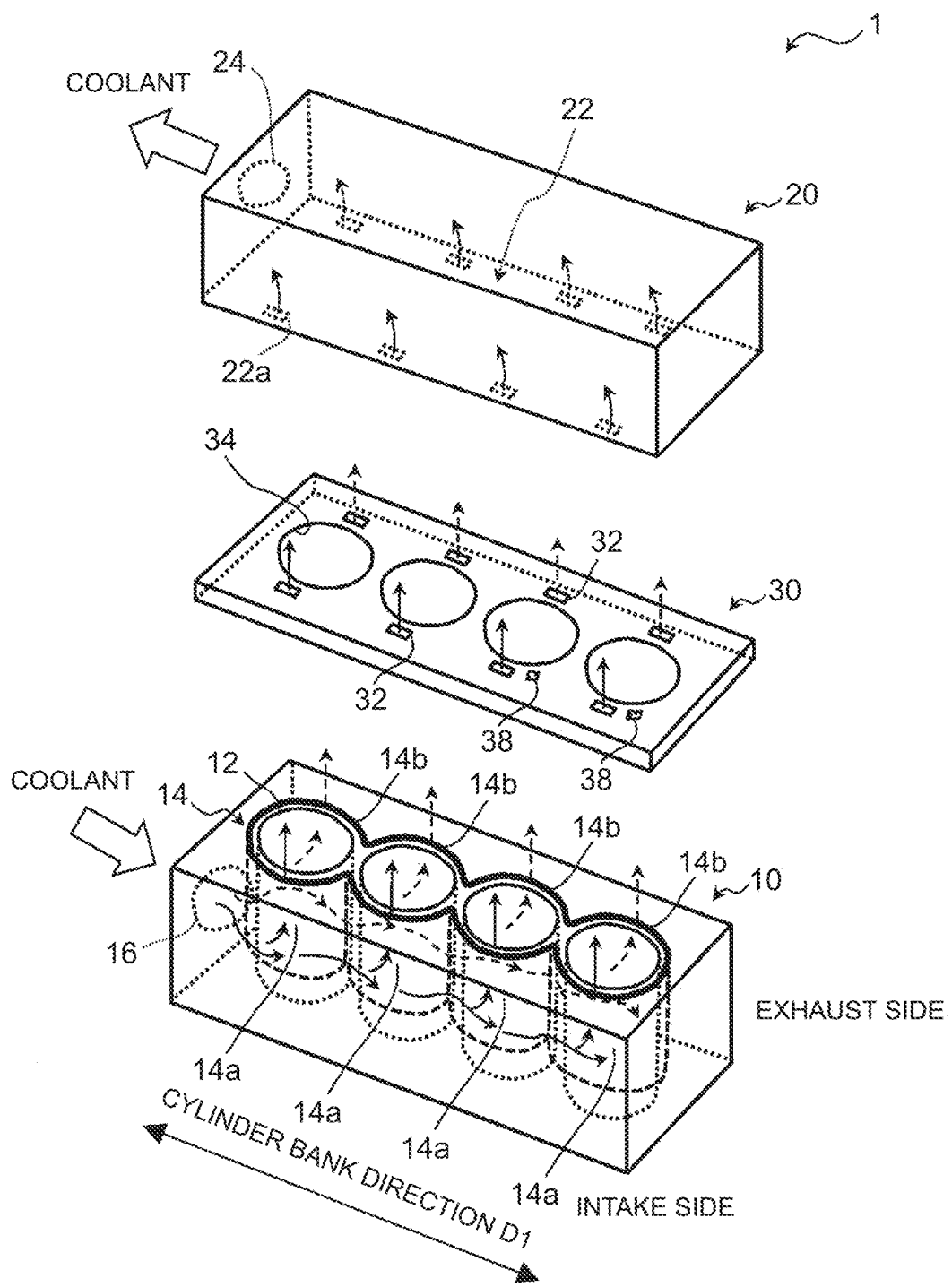
FIG. 1 is a schematic view representing an example of the basic configuration of a water jacket with which an internal combustion engine according to the first embodiment of the disclosure is equipped.

FIG. 1 is a schematic view representing an example of the basic configuration of water jackets 14 and 22 with which an internal combustion engine 1 according to the first embodiment is equipped.

As shown in FIG. 1, the internal combustion engine 1 is equipped with a cylinder block 10, a cylinder head 20, and a head gasket 30. The head gasket 30 is interposed between the cylinder block 10 and the cylinder head 20. More specifically, the cylinder head 20 is fixed to the cylinder block 10 by head bolts (not shown), with the head gasket 30 interposed between the cylinder block 10 and the cylinder head 20.

The cylinder block 10 is equipped with a plurality of (e.g., four) cylinders 12 and an in-block water jacket 14. The four cylinders 12 are arranged in series along a cylinder bank direction D1. In the following description, in specifying the cylinders 12 individually, the cylinders 12 will be referred to also as the first cylinder 12#1, the second cylinder 12#2, the third cylinder 12#3, and the fourth cylinder 12#4 respectively, sequentially from the cylinder closest to one end in the cylinder bank direction D1.

The in-block water jacket 14 is formed around the cylinders 12 inside the cylinder block 10. More specifically, the four cylinders 12 are Siamese-type cylinders having no water jacket between adjacent ones of the cylinders 12. In order to cool the cylinders 12, coolant flows through the in-block water jacket 14. An upper surface (a surface on the cylinder head 20 side) of the in-block water jacket 14 is open. That is, the cylinder block 10 is a so-called open deck-type cylinder block.

Besides, a coolant inlet 16 is provided at one end (an end on the first cylinder 12#1 side) of the cylinder block 10 in the cylinder bank direction D1. Coolant is introduced from the coolant inlet 16 into the in-block water jacket 14. More specifically, the coolant force-fed by a water pump (not shown) is introduced from the coolant inlet 16 into the in-block water jacket 14.

As shown in FIG. 1, the in-block water jacket 14 has a total of four cylinder outer peripheral portions 14a located on intake sides of the four cylinders 12 respectively, and a total of four cylinder outer peripheral portions 14b located on exhaust sides of the four cylinders 12 respectively. On the other hand, an in-head water jacket 22 through which the coolant flows is formed inside the cylinder head 20. In FIG. 1, respective inlets 22a of the in-head water jacket 22, and arrows indicating flow directions of coolant in the in-head water jacket 22 respectively are depicted.

The head gasket 30 has a total of eight coolant opening portions 32 that establish communication between the eight cylinder outer peripheral portions 14a and 14b and the in-head water jacket 22 (the inlets 22a) respectively. The coolant opening portions 32 are formed to allow coolant to flow between the in-block water jacket 14 and the in-head water jacket 22. Besides, cylinder opening portions 34 for establishing communication between the cylinder head 20 and the cylinder block 10 as to the cylinders 12 respectively are formed in the head gasket 30.

The internal combustion engine 1 is configured such that coolant sequentially flows through the respective cylinder outer peripheral portions 14a and 14b along the cylinder bank direction D1 in the in-block water jacket 14. That is, a so-called vertical flow method is adopted as a method of causing coolant to flow in the in-block water jacket 14, in the internal combustion engine 1. In more concrete terms, the internal combustion engine 1 is configured such that coolant sequentially flows through the cylinder outer peripheral portions 14a and 14b along the cylinder bank direction D1 from one end to the other end in the cylinder bank direction D1, on both the intake side and the exhaust side of the in-block water jacket 14, as shown in FIG. 1.

In the configurational example shown in FIG. 1, the coolant introduced from the coolant inlet 16 into the in-block water jacket 14 travels branching off into the intake side and the exhaust side. In more concrete terms, the coolant that has traveled to the intake side sequentially flows from the cylinder outer peripheral portion 14a of the first cylinder 12#1 closest to one end (the coolant inlet 16) in the cylinder bank direction D1 to the cylinder outer peripheral portion 14a of the second cylinder 12#2, the cylinder outer peripheral portion 14a of the third cylinder 12#3, and the cylinder outer peripheral portion 14a of the fourth cylinder 12#4. By the same token, the coolant that has traveled to the exhaust side sequentially flows through the cylinder outer peripheral portion 14b of the first cylinder 12#1, the cylinder outer peripheral portion 14b of the second cylinder 12#2, the cylinder outer peripheral portion 14b of the third cylinder 12#3, and the cylinder outer peripheral portion 14b of the fourth cylinder 12#4.

Moreover, while flowing through the respective cylinder outer peripheral portions 14a and 14b as described above, coolant is transferred to the in-head water jacket 22 via the respective coolant opening portions 32 of the head gasket 30. The coolant introduced into the in-head water jacket 22 is discharged from, for example, the in-head water jacket 22 at a coolant outlet 24 provided at one end of the cylinder head 20 in the cylinder bank direction D1.

1-2. Structure of Head Gasket

Figure 2:
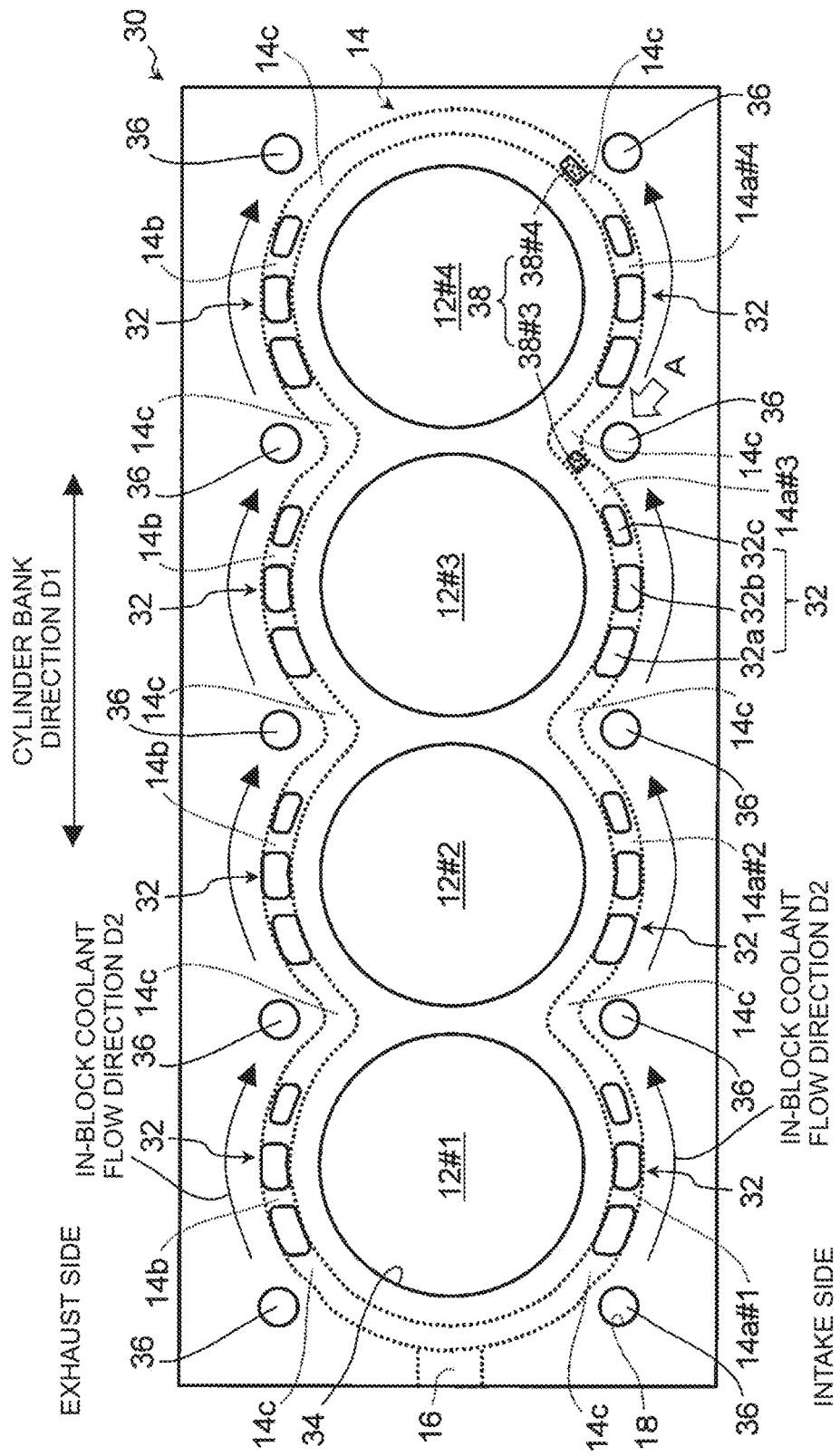
FIG. 2 is a view of a head gasket shown in FIG. 1 as viewed from a cylinder head side.
Figure 3:
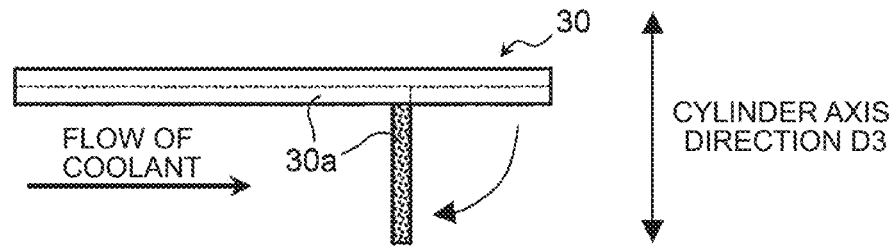
FIG. 3 is a view of a dam portion as viewed in the direction of an arrow A of FIG. 2.

FIG. 2 is a view of the head gasket 30 shown in FIG. 1 as viewed from the cylinder head 20 side. FIG. 3 is a view of a dam portion 38#3 as viewed in a direction indicated by an arrow A in FIG. 2.

A plurality of head bolt boss portions 18 into which head bolts are inserted respectively are formed on an upper portion of the cylinder block 10. A plurality of bolt boss opening portions 36 are formed at positions corresponding to the head bolt boss portions 18 respectively, in the head gasket 30. In the example of in-line four cylinders shown in FIG. 2, the head bolt boss portions 18 and the bolt boss opening portions 36 corresponding thereto are provided at a total of 10 locations, namely, five locations on the intake side and five locations on the exhaust side.

More specifically, for example, the head bolt boss portions 18 and the bolt boss opening portions 36 are arranged at equal intervals in a region of three locations between adjacent ones of the cylinders 12, and in a region of two locations at both ends of the cylinder block 10 around the cylinders 12#1 and 12#4, on both the intake side and the exhaust side, as shown in FIG. 2. Moreover, the head bolt boss portions 18 are provided close to the in-block water jacket 14 on an outer peripheral side of the in-block water jacket 14. As a result, the width of the in-block water jacket 14 in a cylinder radial direction is narrower at bolt periphery portions 14c as regions sandwiched by the head bolt boss portions 18 and bore walls of the cylinders 12 respectively (in other words, regions facing the head bolt boss portions 18 respectively), as shown in FIG. 2.

In addition, as indicated by a broken line in FIG. 2, the cylinder outer peripheral portions 14a and 14b are regions that are curved in the same direction as and with the same radius of curvature as the cylinders 12 and formed around the cylinders 12 respectively. Moreover, the regions of the in-block water jacket 14 around the bolt boss opening portions 36 are regions continuous to the cylinder outer peripheral portions 14a and 14b respectively, and are formed as the bolt periphery portions 14c curved and formed with the radius of curvature in the direction opposite to the cylinder outer peripheral portions 14a and 14b respectively.

Incidentally, in the head gasket 30 shown in FIG. 2, each of the coolant opening portions 32 is constituted of, for example, three openings 32a, 32b, and 32c. Accordingly, coolant is introduced from the in-block water jacket 14 into the in-head water jacket 22 via the three openings 32a, 32b, and 32c.

1-2-1. Concrete Configuration of Dam Portions

The head gasket 30 according to the present embodiment is equipped with two dam portions (baffle portions) 38. In concrete terms, the dam portions 38 are provided as the dam portion 38#3 and a dam portion 38#4 on the intake side. The dam portion 38#3 is provided at a position corresponding to the bolt periphery portion 14c located between the third cylinder 12#3 and the fourth cylinder 12#4. The dam portion 38#4 is provided at a position corresponding to the bolt periphery portion 14c located at the end portion of the cylinder block 10 on the fourth cylinder 12#4 side.

It should be noted herein that the flow direction of coolant in the in-block water jacket 14 will be referred to as "an in-block coolant flow direction D2". The dam portion 38#3 and the dam portion 38#4 are provided, in such a manner as to block the flow of coolant, at the bolt periphery portions 14c as positions downstream of the coolant opening portions 32 (more specifically, positions immediately below the coolant opening portions 32) corresponding to the two cylinder outer peripheral portions 14a#3 and 14a#4 located downstream in the in-block coolant flow direction D2, respectively. In this manner, the dam portions 38 are provided not in the coolant opening portions 32 but at the positions downstream thereof (more specifically, immediately therebelow) respectively.

More specifically, as shown in FIG. 3, the dam portions 38 are formed in such a manner as to extend along a direction substantially perpendicular to the flow of coolant (a cylinder axis direction D3 (in still other words, a vertical direction of the in-block water jacket 14)). Incidentally, although the dam portion 38#3 is exemplified in FIG. 3, the basic shape of the dam portion 38#4 is identical to that of the dam portion 38#3, except the setting of an area that will be described subsequently (more specifically, an area of a surface for backing up coolant).

In the present embodiment, the two dam portions 38#3 and 38#4 are formed such that the area of the dam portion 38#4 located more downstream in the in-block coolant flow direction D2 becomes larger than the area of the dam portion 38#3 located more upstream in the in-block coolant flow direction D2. In more concrete terms, this relationship in magnitude between the areas is realized by, for example, making the height of the downstream dam portion 38#4 (the width in the cylinder axis direction D3) higher than the height of the upstream dam portion 38#3. Incidentally, this relationship in magnitude between the areas may also be realized through the use of the setting of the widths of the dam portions (the widths in the cylinder radial direction) instead of or in addition to the setting of the heights of the dam portions.

Besides, the head gasket 30 of the present embodiment is, for example, a multi-layer structured metal head gasket. As exemplified in FIG. 3, the dam portions 38 (38#3 and 38#4) are formed by bending part of one layer 30a of the metal head gasket 30 on the cylinder block 10 side. Incidentally, the method of forming the dam portions is not limited to such a method. In concrete terms, for example, the head gasket equipped with the dam portions may be configured by, for example, integrating additional pieces equivalent to the dam portions with a head gasket body through the use of a joining method such as welding or caulking.

1-3. Effect

Figure 4A:
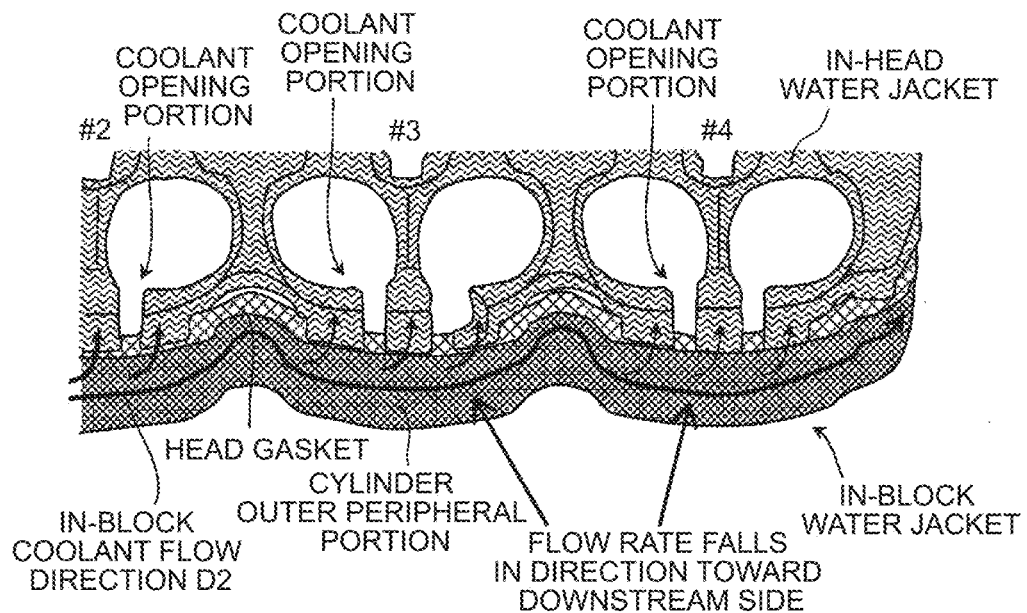
FIG. 4A is a view for illustrating a problem of a comparative example that is referred to for the sake of contrast with the configuration of the first embodiment.
Figure 4B:
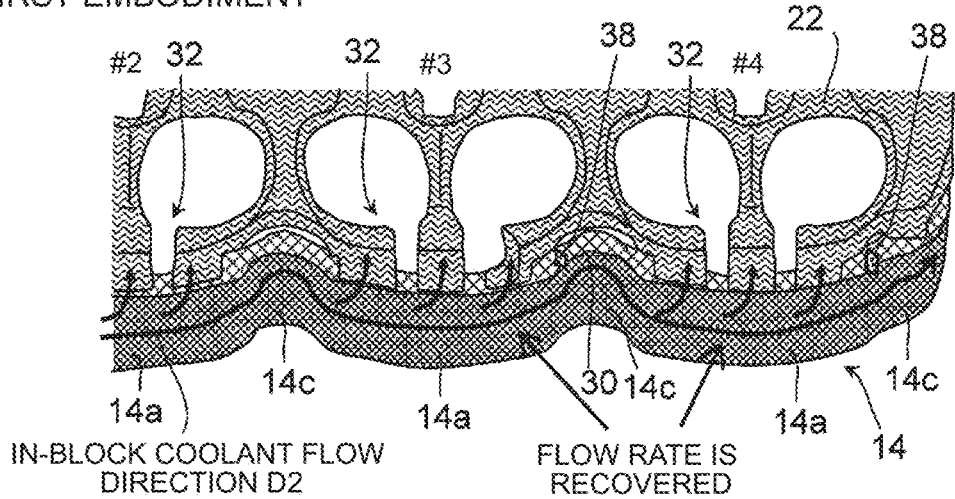
FIG. 4B is a view for illustrating the effect of the configuration of the first embodiment.

FIG. 4A is a view for illustrating a problem of a comparative example that is referred to for the sake of contrast with the configuration of the first embodiment. FIG. 4B is a view for illustrating the effect of the configuration of the first embodiment. The configuration of the comparative example shown in FIG. 4A is identical to the configuration of the internal combustion engine 1 according to the first embodiment, except that the dam portions 38 are not provided.

In the case where the aforementioned vertical flow method is adopted as a method of causing coolant to flow in the in-block water jacket, coolant gradually rises from the upstream side to the in-head water jacket via the coolant opening portions, while flowing through the respective cylinder outer peripheral portions along the in-block coolant flow direction D2. As a result, the flow rate of coolant flowing through the in-block water jacket decreases in the direction toward the downstream side. Therefore, in the case where no dam portion is provided as in the comparative example, as shown in FIG. 4A, the flow rate of coolant flowing from the in-block water jacket toward the in-head water jacket is lower at the cylinder outer peripheral portions located on the downstream side (i.e., falls in the direction toward the downstream side). As a result, the flow rate disperses among the cylinders.

In contrast, in the internal combustion engine 1 according to the present embodiment, the dam portions 38#3 and 38#4 are provided at positions downstream of (immediately below) the cylinder outer peripheral portions 14a#3 and 14a#4 located downstream in the in-block coolant flow direction D2, respectively. Thus, as shown in FIG. 4B, flow passages of coolant upstream of (immediately upstream of) the respective dam portions 38 are partially backed up by the dam portions 38, so the pressure of coolant upstream of the dam portions 38 is enhanced. As a result, the flow rate of coolant flowing in the vicinity of the coolant opening portions 32 located upstream of (immediately upstream of) the dam portions 38 respectively can be recovered. Therefore, the flow rate of coolant flowing toward the in-head water jacket 22 through the coolant opening portions 32 can be restrained from falling.

As described above, with the internal combustion engine 1 according to the present embodiment, the flow rate of coolant can be restrained from dispersing among the cylinders 12, through the use of a simple method of changing the shape of the head gasket 30, as to the transfer of coolant from the in-block water jacket 14 to the in-head water jacket 22.

Besides, the dam portions 38 according to the present embodiment are located at positions corresponding to the bolt periphery portions 14c as regions of the in-block water jacket 14 that are sandwiched by the head bolt boss portions 18 and the bore walls of the cylinders 12 adjacent thereto, respectively. As described above, the width of the in-block water jacket 14 is narrower at the bolt periphery portions 14c. By arranging the dam portions 38 at the narrow bolt periphery portions 14c respectively, coolant can be efficiently backed up. It should be noted, however, that the dam portions 38 may not necessarily be arranged at the bolt periphery portions 14c, but may be arranged at the cylinder outer peripheral portions 14a respectively, in a broad sense, as long as the dam portions 38 are located at positions downstream of the coolant opening portions 32 where the flow rate needs to be recovered through the arrangement of the dam portions, respectively. More specifically, in the case where another coolant opening portion B exists downstream of a coolant opening portion A where the flow rate needs to be recovered through the arrangement of the dam portions, the dam portions 38 may be provided at the cylinder outer peripheral portions 14a located between the coolant opening portion A and the coolant opening portion B, respectively.

Furthermore, the dam portions 38 according to the present embodiment are formed such that the area (height) of the dam portion 38#4 located more downstream in the in-block coolant flow direction D2 becomes larger than the area (height) of the dam portion 38#3 located more upstream in the in-block coolant flow direction D2. According to this configuration, in view of the problem of the flow rate of coolant flowing from the in-block water jacket toward the in-head water jacket falling in the direction toward the downstream side in the case where no dam portion is provided, the flow rate can be more effectively restrained from dispersing among the cylinders.

Besides, the dam portions 38 according to the present embodiment are formed by bending part of one layer 30a of the head gasket 30 as the metal head gasket on the cylinder block 10 side. Thus, the head gasket 30 that is equipped with the dam portions 38 having the foregoing function can be simply configured.

(Supplement)

In addition, in the case where the cross-sectional area of the in-block water jacket decreases from the coolant inlet toward the coolant outlet as in the case of the internal combustion engine described in Japanese Unexamined Patent Application Publication No. 2013-024081 (JP 2013-024081 A) (i.e., the configuration in which the entire flow passages in the in-block water jacket are throttled), the pressure loss of coolant is excessively large. In contrast, according to the present embodiment, the dam portions 38 are appropriately provided in regions where the flow rate needs to be recovered. Thus, the pressure of coolant in the regions where the flow rate needs to be recovered can be enhanced, and the flow rate of coolant rising to the in-head water jacket 22 can be adjusted, while making the pressure loss smaller than in the internal combustion engine described in JP 2013-024081 A. More specifically, the dam portions 38 can back up the flow of coolant only in the vicinity of the coolant opening portions 32 for causing coolant to flow to the in-head water jacket 22, and can efficiently raise coolant to the in-head water jacket 22.

Besides, the dam portions 38 are integrated with the head gasket 30. Therefore, a shift to a specification with the dam portions 38 can be easily made by replacing the head gasket having no dam portions 38 with the head gasket 30 having the dam portions 38. Besides, it is also conceivable to improve the dispersion of the flow rate among the cylinders through the use of a water jacket spacer that is separate from the head gasket. However, according to the present embodiment, while avoiding complication of the structure resulting from the addition of the water jacket spacer and an increase in flow passage resistance in the in-block water jacket due to the presence of a support portion of the water jacket spacer, the dispersion of the flow rate among the cylinders can be improved more than in this method.

Furthermore, the measure taken through the use of the dam portions 38 is not a measure taken individually for each of the openings 32a to 32c of each of the coolant opening portions 32, but is designed to enhance the flow rate of coolant passing through the entire coolant opening portions 32 of the cylinder outer peripheral portions 14a where the flow rate needs to be recovered. Accordingly, the number of dam portions 38 can be made smaller and hence further simplification is achieved than in the case where a measure is taken individually against each of the openings 32a to 32c.

1-4. Modification Examples

In the foregoing first embodiment, the example of arrangement of the dam portions 38 has been described citing, as an example, the in-line four-cylinder internal combustion engine 1 configured such that coolant sequentially flows through the cylinder outer peripheral portions 14a and 14b along the cylinder bank direction D1 from one end to the other end in the cylinder bank direction D1, on both the intake side and the exhaust side of the in-block water jacket 14. However, "the dam portions" according to the disclosure may be arranged in the internal combustion engine 1 according to, for example, the following methods exemplified in FIGS. 5 to 9.

Figure 5:
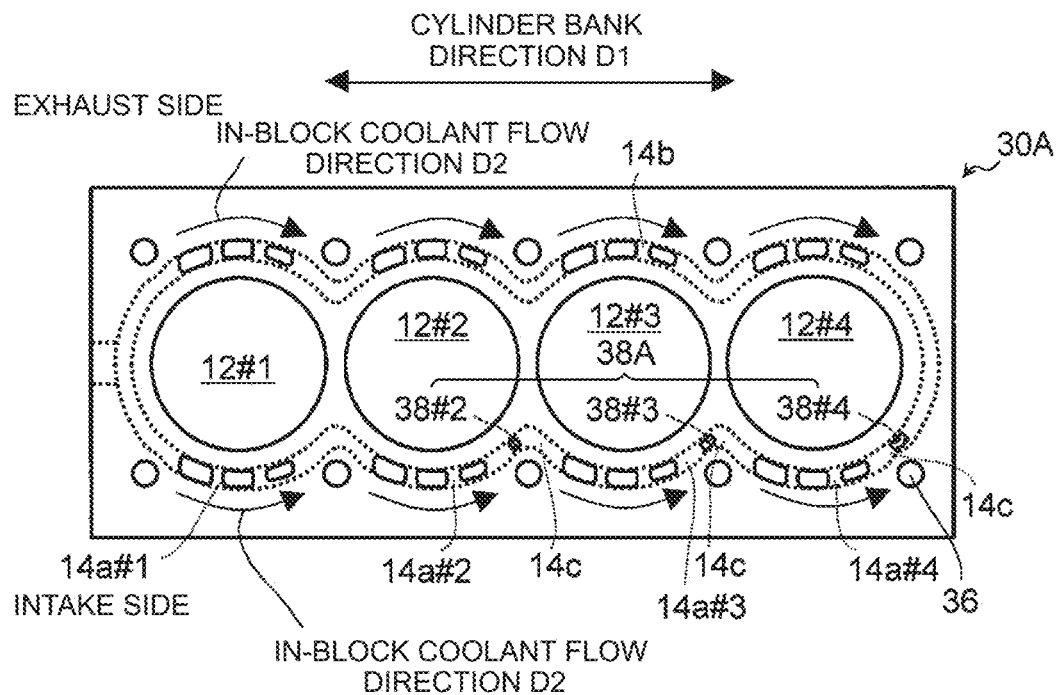
FIG. 5 is a view representing the structure of a head gasket according to a first modification example A of the first embodiment.

FIG. 5 is a view representing the structure of a head gasket 30A according to a first modification example A of the first embodiment. In the first modification example A shown in FIG. 5, the head gasket 30A is equipped with dam portions 38A at three locations on the intake side. In concrete terms, in addition to the dam portions 38#3 and 38#4, the dam portion 38#2 is equivalent to the dam portion 38A. The dam portion 38#2 is provided at a position corresponding to the bolt periphery portion 14c located between the second cylinder 12#2 and the third cylinder 12#3. The areas (heights) of the respective dam portions 38A sequentially decrease from the dam portion 38#4 with the largest area (the highest height) located most downstream to the dam portion 38#3 and the dam portion 38#2.

Figure 6:
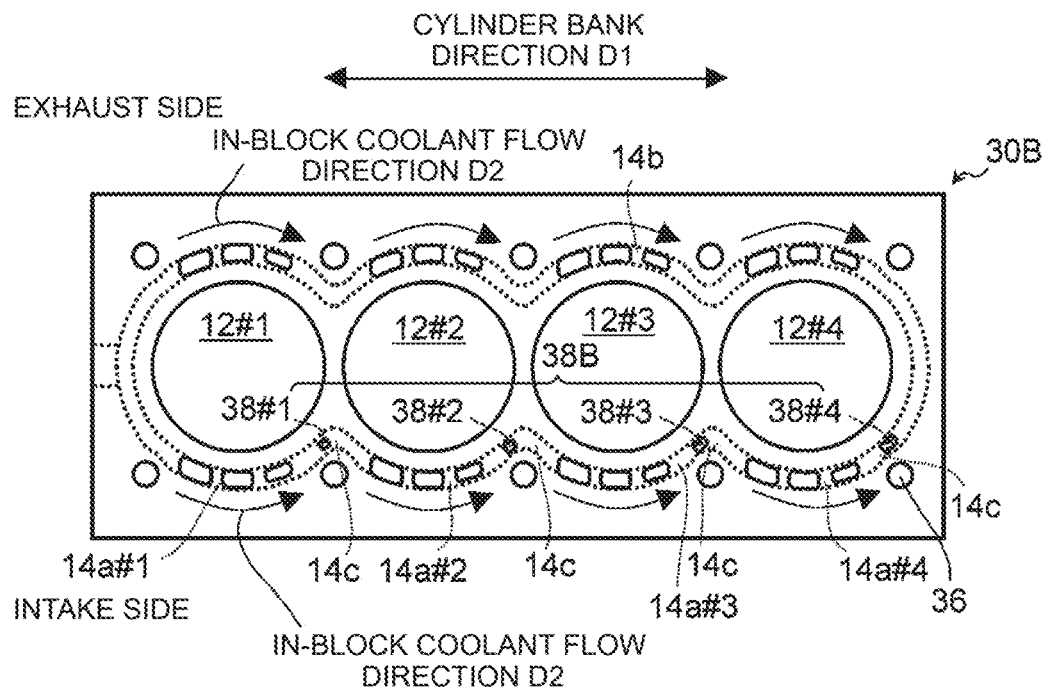
FIG. 6 is a view representing the structure of a head gasket according to a second modification example B of the first embodiment.

FIG. 6 is a view representing the structure of a head gasket 30B according to a second modification example B of the first embodiment. In the second modification example B shown in FIG. 6, the head gasket 30B is equipped with dam portions 38B at four locations on the intake side (i.e., for all the cylinder outer peripheral portions 14a). In concrete terms, in addition to the dam portions 38#2, 38#3, and 38#4, the dam portion 38#1 is equivalent to the dam portion 38B. The dam portion 38#1 is provided at a position corresponding to the bolt periphery portion 14c located between the first cylinder 12#1 and the second cylinder 12#2. The areas (heights) of the respective dam portions 38B sequentially decrease from the dam portion 38#4 with the largest area (the highest height) located most downstream to the dam portion 38#3, the dam portion 38#2, and the dam portion 38#1.

Figure 7:
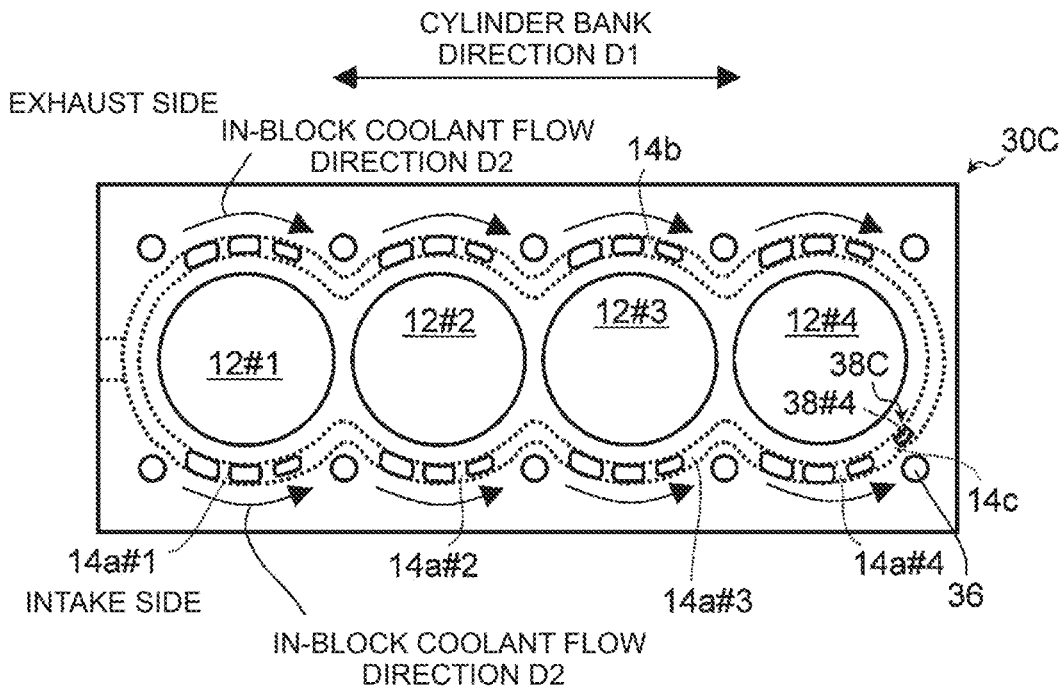
FIG. 7 is a view representing the structure of a head gasket according to a third modification example C of the first embodiment.

FIG. 7 is a view representing the structure of a head gasket 30C according to a third modification example C of the first embodiment. In the third modification example C shown in FIG. 7, the head gasket 30C is equipped with a dam portion 38C at one location on the intake side. In concrete terms, only the dam portion 38#4 is equivalent to the dam portion 38C. That is, in the third modification example C, the dam portion 38C is arranged only at a position downstream of (immediately below) the coolant opening portion 32 corresponding to the cylinder outer peripheral portion 14a located most downstream in the in-block coolant flow direction D2.

Figure 8:
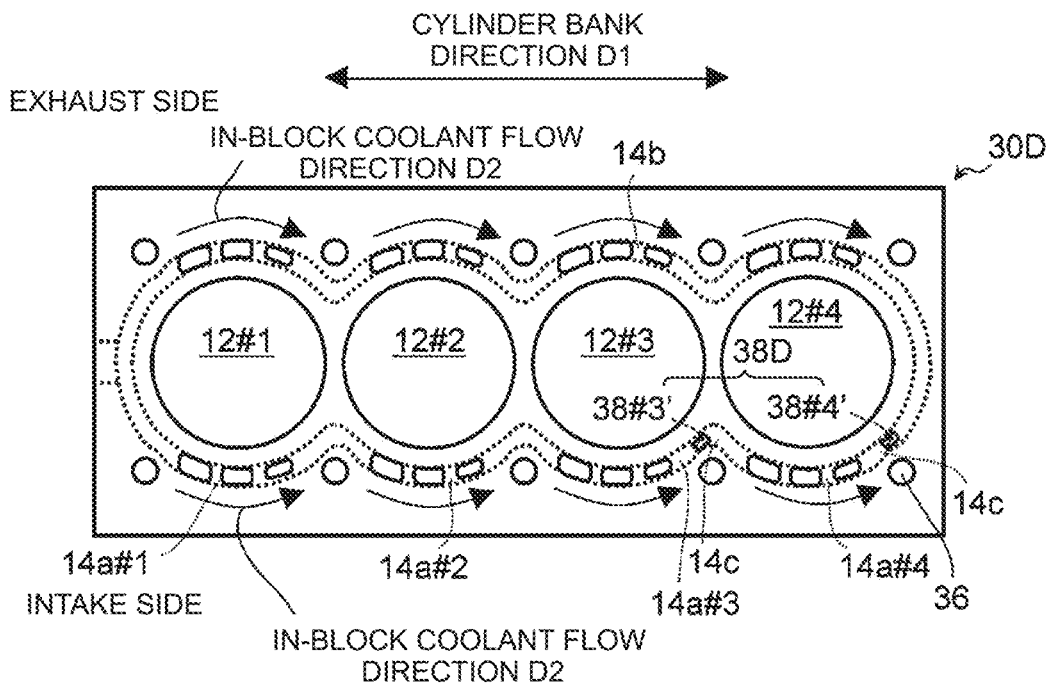
FIG. 8 is a view representing the structure of a head gasket according to a fourth modification example D of the first embodiment.

FIG. 8 is a view representing the structure of the head gasket 30D according to a fourth modification example D of the first embodiment. In the fourth modification example D shown in FIG. 8 as well as the first embodiment (see FIG. 2), the head gasket 30D is equipped with dam portions 38D at two locations on the intake side (i.e., for the cylinder outer peripheral portions 14a of the third cylinder 12#3 and the fourth cylinder 12#4). It should be noted, however, that in the fourth modification example D, dam portions 38#3' and 38#4' equivalent to the dam portions 38D are formed with the same area (height) unlike the first embodiment.

Incidentally, as described already, "the dam portions" according to the disclosure are provided to restrain the flow rate of coolant flowing toward the in-head water jacket from dispersing among the cylinders. Therefore, in the case where the dam portions having the same area (height) are provided on the intake side as in the fourth modification example D shown in FIG. 8, the dam portions may be arranged downstream of the coolant opening portions corresponding to arbitrary ones of the cylinder outer peripheral portions respectively, on the condition that the cylinder outer peripheral portion located most upstream in the in-block coolant flow direction is excluded.

Figure 9:
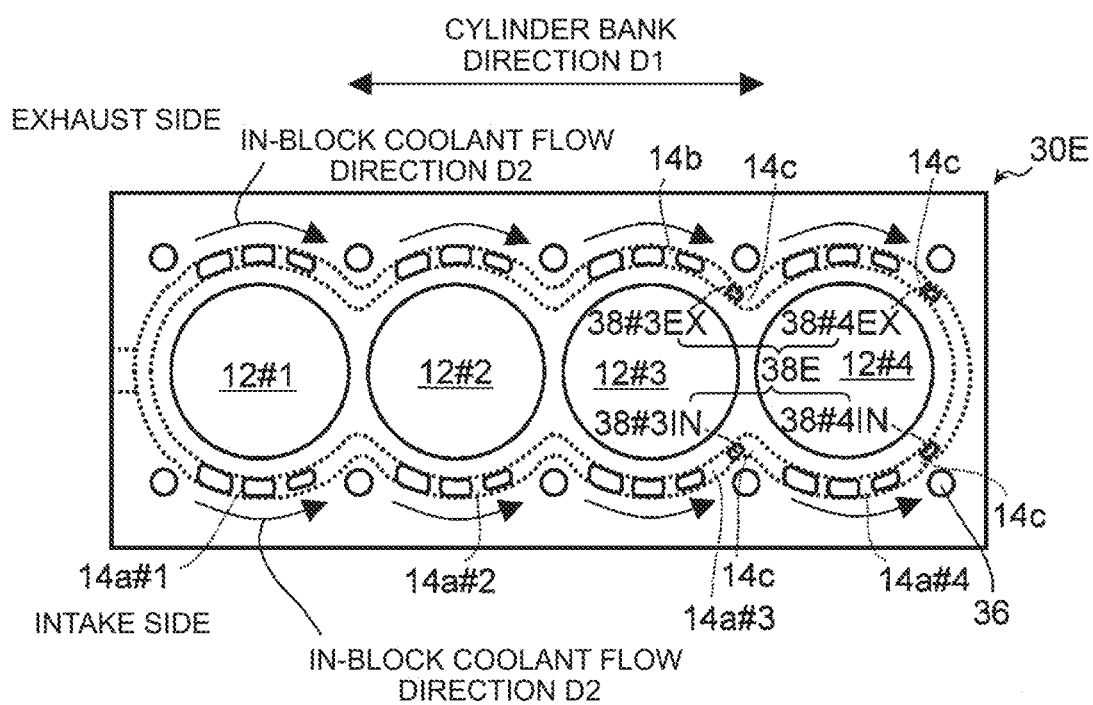
FIG. 9 is a view representing the structure of a head gasket according to a fifth modification example E of the first embodiment.

FIG. 9 is a view representing the structure of a head gasket 30E according to a fifth modification example E of the first embodiment. In the fifth modification example E shown in FIG. 9, the head gasket 30E is equipped with dam portions 38E at two locations on the exhaust side as well as at two locations on the intake side as in the case of the first embodiment (see FIG. 2). In concrete terms, dam portions 38#3EX and 38#4EX as well as dam portions 38#3IN and 38#4IN are equivalent to the dam portions 38E. The dam portion 38#3EX is provided at a position corresponding to the bolt periphery portion 14c located between the second cylinder 12#2 and the third cylinder 12#3 on the exhaust side. The dam portion 38#4EX is provided at a position corresponding to the bolt periphery portion 14c located between the third cylinder 12#3 and the fourth cylinder 12#4 on the exhaust side. As is the case with the intake side, the area (height) of the dam portion 38#4EX located downstream on the exhaust side is larger than the area (height) of the dam portion 38#3EX located upstream on the exhaust side.

Besides, the number of dam portions provided on the exhaust side may be changed in the same manner as in the examples shown in FIGS. 5 to 7. Furthermore, the areas (heights) of the dam portions provided on the exhaust side may be determined from a point of view similar to the description regarding the example shown in FIG. 8. Besides, the dam portions according to the disclosure may be provided only on the exhaust side of the cylinder block, without being provided on the intake side of the cylinder block, unlike the foregoing respective examples.

2. Second Embodiment

Next, the second embodiment of the disclosure will be described with reference to FIG. 10. The internal combustion engine according to the present embodiment is configured in the same manner as the internal combustion engine 1 according to the first embodiment, except what will be described below.

FIG. 10 is a view of a head gasket 50 and a cylinder block 40 located therebelow according to the second embodiment, as viewed from the cylinder head 20 side. The internal combustion engine according to the second embodiment is equipped with the cylinder head 20 having the in-head water jacket 22 similar to that of the first embodiment, the cylinder block 40, and the head gasket 50. The cylinder block 40 is equipped with the four cylinders 12 (12#1 to 12#4) similar to those of the internal combustion engine 1, and an in-block water jacket 44 formed around the cylinders.

2-1. Basic Configuration of Water Jacket

As shown in FIG. 10, the in-block water jacket 44 has a total of four cylinder outer peripheral portions 44a located on intake sides of the four cylinders 12 respectively, and a total of four cylinder outer peripheral portions 44b (44b#1 to 44b#4) located on exhaust sides of the four cylinders 12 respectively. The internal combustion engine according to the second embodiment is also configured such that coolant sequentially flows through the cylinder outer peripheral portions 44a and 44b along the cylinder bank direction D1, in the in-block water jacket 44. It should be noted, however, that the in-block water jacket 44 is different from the in-block water jacket 14 of the first embodiment in the concrete method of causing coolant to flow.

In concrete terms, a coolant inlet 42 to the cylinder block 40 is provided in the cylinder block 40 at one end of the intake side of the cylinder block 40 (an end on the first cylinder 12#1 side) in the cylinder bank direction D1. Moreover, as shown in FIG. 10, the internal combustion engine according to the second embodiment is configured such that coolant first flows sequentially through parts of the four cylinder outer peripheral portions 44a along the cylinder bank direction D1, from one end to the other end in the cylinder bank direction D1, on the intake side of the in-block water jacket 44, and then flows sequentially through the other parts of the four cylinder outer peripheral portions 44b along the cylinder bank direction D1, from the other end to the one end in the cylinder bank direction D1, on the exhaust side of the in-block water jacket 44. More specifically, the coolant that has traveled to the intake side sequentially flows from the cylinder outer peripheral portion 44a of the first cylinder 12#1 closest to one end in the cylinder bank direction D1 (the coolant inlet 42) to the cylinder outer peripheral portion 44a of the second cylinder 12#2, the cylinder outer peripheral portion 44a of the third cylinder 12#3, and the cylinder outer peripheral portion 44a of the fourth cylinder 12#4. After that, the coolant turns around, and sequentially flows through the cylinder outer peripheral portion 44b of the fourth cylinder 12#4, the cylinder outer peripheral portion 44b of the third cylinder 12#3, the cylinder outer peripheral portion 44b of the second cylinder 12#2, and the cylinder outer peripheral portion 44b of the first cylinder 12#1 on the exhaust side.

Then, the coolant is transferred to the in-head water jacket 22 via the respective coolant opening portions 32 of the head gasket 50, as is the case with the internal combustion engine 1, while flowing through the respective cylinder outer peripheral portions 44a and 44b as described above.

2-2. Concrete Configuration of Dam Portions

The head gasket 50 of the present embodiment is equipped with, for example, dam portions 52 at four locations. In concrete terms, the dam portions 52 are provided as dam portions 52#4, 52#3, 52#2, and 52#1 on the exhaust side. The dam portion 52#4 is provided at a position corresponding to the bolt periphery portion 44c located between the fourth cylinder 12#4 and the third cylinder 12#3. The dam portion 52#3 is provided at a position corresponding to the bolt periphery portion 44c located between the third cylinder 12#3 and the second cylinder 12#2. The dam portion 52#2 is provided at a position corresponding to the bolt periphery portion 44c located between the second cylinder 12#2 and the first cylinder 12#1. Moreover, the dam portion 52#1 is provided at a position corresponding to the bolt periphery portion 44c located at an end portion of the cylinder block 40 on the first cylinder 12#1 side.

It should be noted herein that the direction of flow of coolant in the in-block water jacket 44 will be referred to as "an in-block coolant flow direction D4". The four dam portions 52#1 to 52#4 are provided, in such a manner as to block the flow of coolant, at the bolt periphery portions 44c as positions downstream of the coolant opening portions 32 (more specifically, positions immediately below the coolant opening portions 32) corresponding to the four cylinder outer peripheral portions 44b#1 to 44b#4 located downstream in the in-block coolant flow direction D4, respectively.

Besides, in the present embodiment as well, the four dam portions 52#1 to 52#4 are formed such that the area (height) of a certain one of the dam portions 52 located more downstream in the in-block coolant flow direction D4 becomes larger than the area (height) of another one of the dam portions 52 located more upstream in the in-block coolant flow direction D4. In more concrete terms, the area (height) of the dam portions 52 decreases from the dam portion 52#1 located most downstream to the dam portion 52#2, the dam portion 52#3, and the dam portion 52#4 in this sequence. Incidentally, as described in the first embodiment, this relationship in magnitude among the areas may be realized through the use of the setting of the widths of the dam portions (the widths in the cylinder radial direction) instead of or in addition to the setting of the heights of the dam portions.

Besides, the head gasket 50 of the present embodiment is, for example, a multi-layer structured metal head gasket as is the case with the head gasket 30, and is formed by bending part of one layer on the cylinder block 40 side.

2-3. Effect

The internal combustion engine according to the second embodiment in which coolant flows along the in-block coolant flow direction D4 shown in FIG. 10 also exerts an effect similar to that of the internal combustion engine 1 according to the first embodiment, through the use of the dam portions 52.

2-4. Modification Examples

In the internal combustion engine according to the second embodiment in which coolant flows along the in-block coolant flow direction D4 as well, the dam portions may be arranged as follows, unlike the example shown in FIG. 10, as is the case with the relationship between the first embodiment and the modification examples A to C thereof.

That is, first of all, in the example in which dam portions that are formed such that the area of a certain one of the dam portions located more downstream in the in-block coolant flow direction D4 becomes larger than the area of another one of the dam portions located more upstream in the in-block coolant flow direction D4 are provided, an arbitrary number of dam portions may be arranged at positions downstream of the coolant opening portions 32 corresponding to the cylinder outer peripheral portions 44a on the intake side, as well as at positions downstream of the coolant opening portions 32 corresponding to the cylinder outer peripheral portions 44b on the exhaust side, respectively.

Besides, in the example in which dam portions with the same area (height) are provided, the dam portions may be provided at positions downstream of the coolant opening portions 32 corresponding to the arbitrary cylinder outer peripheral portions 44a and 44b except the cylinder outer peripheral portion located most upstream in the in-block coolant flow direction D4 (the cylinder outer peripheral portion 44a of the first cylinder 12#1 in the example shown in FIG. 10) respectively.

Besides, the internal combustion engine that is equipped with "the dam portion or the dam portions" according to the disclosure may be equipped with an in-block water jacket in which coolant flows in the direction opposite to the in-block coolant flow direction D4 of the second embodiment. That is, the internal combustion engine may be equipped with an in-block water jacket in which coolant first flows from one end (the end on the first cylinder 12#1 side) toward the other end in the cylinder bank direction on the exhaust side, then turns around, and flows from the other end toward the one end on the intake side. Moreover, in this internal combustion engine, the dam portions may be provided, for example, at positions downstream of the coolant opening portions 32 corresponding to the four cylinder outer peripheral portions 44a on the intake side respectively, as opposed to the example shown in FIG. 10. Furthermore, the arrangement of the dam portions in this internal combustion engine may be appropriately changed, as is the case with the relationship between the foregoing second embodiment and the modification examples thereof.

Incidentally, the internal combustion engine to which the disclosure is applied is not limited to an in-line four-cylinder engine as long as the engine is equipped with an arbitrary number of cylinders arranged in series along a cylinder bank direction. Besides, "the cylinders" may not necessarily be all the cylinders of the internal combustion engine. In the case of, for example, a V-type internal combustion engine, a plurality of cylinders constituting each of banks are equivalent to "the cylinders".

The examples mentioned in the respective embodiments described above and the other respective modification examples may be appropriately combined with one another within a permissible range in addition to the specified combinations, and may be modified in various manners within such a range as not to depart from the gist of the disclosure.

What is claimed is:

1. An internal combustion engine comprising:
  a cylinder block having a plurality of cylinders arranged in series along a cylinder bank direction, and an in-block water jacket which is formed around the cylinders and through which coolant flows;
  a cylinder head having an in-head water jacket through which the coolant flows; and
  a head gasket that is interposed between the cylinder block and the cylinder head, wherein
  the in-block water jacket includes a plurality of cylinder outer peripheral portions that are located on both an intake side and an exhaust side of the cylinders respectively,
  the head gasket includes a plurality of coolant opening portions that establish communication between the cylinder outer peripheral portions and the in-head water jacket respectively,
  a configuration in which the coolant sequentially flows through the cylinder outer peripheral portions along the cylinder bank direction in the in-block water jacket is adopted in the internal combustion engine, and the head gasket includes one or a plurality of dam portions provided, in such a manner as to block flow of the coolant, at a position downstream of the coolant opening portion corresponding to the cylinder outer peripheral portion located at least most downstream in an in-block coolant flow direction as a direction of flow of the coolant in the in-block water jacket.

2. The internal combustion engine according to claim 1, wherein the cylinder block includes a plurality of head bolt boss portions which are formed on an outer peripheral side of the in-block water jacket and into which a plurality of head bolts for fixing the cylinder head to the cylinder block via the head gasket are inserted respectively, and the dam portion or each of the dam portions is arranged at a corresponding one of bolt peripheral portions that are regions of the in-block water jacket sandwiched by the head bolt boss portions and bore walls of the cylinders respectively.

3. The internal combustion engine according to claim 1 that is configured such that the coolant sequentially flows through the cylinder outer peripheral portions along the cylinder bank direction, from one end to the other end in the cylinder bank direction, on both the intake side and the exhaust side of the in-block water jacket, wherein the dam portion or the dam portions include a plurality of dam portions arranged on at least one of the intake side and the exhaust side, and the dam portions are formed such that an area of a certain one of the dam portions located more downstream in the in-block coolant flow direction is larger than an area of another one of the dam portions located more upstream in the in-block coolant flow direction.

4. The internal combustion engine according to claim 1 that is configured such that the coolant sequentially flows through parts of the cylinder outer peripheral portions along the cylinder bank direction, from one end to the other end in the cylinder bank direction, on one of the intake side and the exhaust side of the in-block water jacket, and then flows through the other parts of the cylinder outer peripheral portions along the cylinder bank direction, from the other end to the one end in the cylinder bank direction, on the other of the intake side and the exhaust side, wherein the dam portion or the dam portions include a plurality of dam portions arranged on at least one of the intake side and the exhaust side, and the dam portions are formed such that an area of a certain one of the dam portions located more downstream in the in-block coolant flow direction is larger than an area of another one of the dam portions located more upstream in the in-block coolant flow direction.

5. The internal combustion engine according to claim 1, wherein the dam portion or the dam portions include a plurality of dam portions arranged on at least one of the intake side and the exhaust side, the dam portions are equal in area to one another, and the dam portions are arranged downstream of the coolant opening portions corresponding to the cylinder outer peripheral portions except the cylinder outer peripheral portion located most upstream in the in-block coolant flow direction, respectively.

6. The internal combustion engine according to claim 1, wherein the head gasket is a multi-layer structured metal head gasket, and the metal head gasket has a layer including a bent part bent toward the cylinder block, the bent part defining the dam portion or the dam portions.

7. The internal combustion engine according to claim 1, wherein each of the plurality of cylinders includes a coolant opening portion at a corresponding cylinder outer peripheral portion among the plurality of cylinder outer peripheral portions and in communication with a corresponding coolant opening portion among the plurality of coolant opening portions of the head gasket.

\* \* \* \* \*